United States Patent
Dorenbos et al.

(10) Patent No.: US 11,402,049 B2
(45) Date of Patent: Aug. 2, 2022

(54) ROPE PROTECTOR AND ASSOCIATED METHODS

(71) Applicant: Dirk Otto Dorenbos, Canmore (CA)

(72) Inventors: Dirk Otto Dorenbos, Canmore (CA); Adrian Nastase, Calgary (CA)

(73) Assignee: Dirk Otto Dorenbos, Canmore (CA)

( * ) Notice: Subject to any disclaimer, the term of this patent is extended or adjusted under 35 U.S.C. 154(b) by 308 days.

(21) Appl. No.: 16/856,960

(22) Filed: Apr. 23, 2020

(65) Prior Publication Data

US 2020/0340611 A1    Oct. 29, 2020

Related U.S. Application Data

(60) Provisional application No. 62/838,711, filed on Apr. 25, 2019.

(51) Int. Cl.
*F16L 57/06* (2006.01)

(52) U.S. Cl.
CPC .................................. *F16L 57/06* (2013.01)

(58) Field of Classification Search
CPC .................................. F16L 57/06; A62B 1/18
USPC .......................................................... 16/2.1
See application file for complete search history.

(56) References Cited

U.S. PATENT DOCUMENTS

| | | | | |
|---|---|---|---|---|
| 2,702,631 A * | 2/1955 | Hamaker | ............... | A01D 45/02 209/136 |
| 6,719,243 B1 | 4/2004 | Haverty | | |
| 8,627,619 B2 | 1/2014 | Heaney | | |
| 9,517,362 B1 * | 12/2016 | Siegel | ........................ | A45F 4/02 |
| 2013/0317677 A1 * | 11/2013 | Pereira | .................. | B63B 17/023 701/21 |
| 2018/0009627 A1 | 1/2018 | Mabbett et al. | | |

FOREIGN PATENT DOCUMENTS

GB    2507665    5/2014

OTHER PUBLICATIONS

DMM Professional—Edgehog, retrieved from <https://dmmprofessional.com/Products/Edge-Management/Edgehog> on Aug. 2, 2018.
Gratemate Grating Rope Protector for grating walkways, retrieved from <https://www.heightec.com/product/rope-protection/gratemate-grating-rope-protector/> on Aug. 2, 2018.
Mac-Pro, retrieved from <https://mac-pro.com.au/#info> on Aug. 2, 2018.
Rope Access Equipment/Gorilla Rope Gear, retrieved from <https://www.gorillaropegear.com/product-page/rope-access-tool-bag> on Aug. 2, 2018.

* cited by examiner

*Primary Examiner* — Giovanni Astacio-Oquendo
(74) *Attorney, Agent, or Firm* — McCoy Russell LLP

(57) ABSTRACT

A rope protector for protecting a rope as it passes through a grating. The rope protector comprises an enclosed channel portion, a head portion and a foot portion. The channel portion is waisted to allow the rope to be rotated within a hole in a grating. The head portion extends laterally from one end of the channel portion to prevent passage of the rope protector through the grating hole and the foot portion extends laterally from the other end of the channel portion to be passed through the grating hole when aligned with the grating hole and to prevent the foot portion being removed from the grating hole when rotated.

20 Claims, 8 Drawing Sheets

ROPE PROTECTOR AND ASSOCIATED METHODS

CROSS-REFERENCE TO RELATED APPLICATION

This application claims the benefit of U.S. Provisional Patent Application No. 62/838,711 filed Apr. 25, 2019, which is incorporated by reference herein in its entirety.

FIELD OF THE INVENTION

The invention relates generally to protecting ropes during rope access, and more particularly to a tool for inserting into industrial grating such as walkway grating for protecting rope passing through the grating.

BACKGROUND

In the field of industrial rope access, areas of industrial sites are often accessed using ropes.

Ropes are used frequently in the energy industry for basic maintenance and inspection, on onshore and offshore oil platforms and power plants. Wind turbines, bridges and dams, high-rise buildings, aerials, telecommunication and electrical transmission towers, construction assist, event rigging and installations. Ropes can also be used to allow workers to access difficult-to-reach locations. Standard practice is to use two ropes, a working line and a safety line, to provide a back up in the unlikely case of a failure in the first rope system.

Metal walkway gratings are used widely, in floorings and walkways in industrial applications like oil rigs, chemical plants and refineries. The metal bars making up the gratings can be sharp (e.g. either intrinsically or by being damaged or corroded). One example of gratings are the gratings provided by Lionweld Kennedy Flooring Limited™. The gratings generally have a meshwork of metal bars with holes between the bars that allow light, liquid, air, heat, sound and objects smaller than the holes to pass through the grating, but prevent objects larger than the holes from passing through. The size of the holes, i.e. the width, length and depth, can vary, but often standard size gratings are used for specific applications.

Generally, ropes need to be rigged above and through metal gratings for work done below the gratings. However, the ropes should be protected as the pass through the grating.

The DMM International Ltd™ Edgehog™ rope protector is made from stainless steel and comprises two screw mounted removable fixation bolts (17 mm spanner required).

The Heightec™ Gratemate™ grating rope protector is designed for metal or composite grating walkways known as 'Kennedy grating' found on offshore platforms and petrochemical as well as process sites. The Gratemate has four cord attachment points to secure the rope protector.

The Mac-Pro™ uses a heavy-duty nylon compound for protection against sharp edges, rope wear and high surface temperatures. The protector can be secured to the grid mesh with the supplied cord to prevent it becoming a dropped object.

The Gorilla Grating Insert™ is made for protection against hard edges along industry standard grating. It enables the user to pass ropes through industry standard Kennedy grating.

SUMMARY

In accordance with the invention, there is provided a rope protector comprising:

an enclosed channel portion configured to receive a rope, wherein the enclosed channel portion has a waisted portion configured to allow the rope protector to be passed partially through, and be rotated within, a hole in a grating;

a head portion laterally extending from a proximal end of the channel portion to prevent passage of the rope protector through the grating hole;

a foot portion at a distal end of the channel portion, wherein the foot portion is configured be passed through the grating hole when aligned with the grating hole and to prevent the foot portion being removed from the grating hole when rotated to be in non-alignment with the grating hole.

An enclosed channel may be considered to be a tube, conduit or pipe which could surround a rope. The enclosed channel in this case would be open at both ends to allow the rope to be inserted and move through the enclosed channel.

Using mechanical features of the rope protector to engage with the grating may reduce or eliminate the need to tie the rope protector to the grating (e.g. with string).

A grating may be considered to be a framework of bars (e.g. parallel or crossed), typically preventing access through an opening while permitting communication or ventilation. The grating may be in the form of a grid. The grating may provide a walking surface on an industrial site or in scaffolds. Gratings may be between ½ inch and 2 inch thick.

The grating hole may be longer along one axis than along another axis which is at an angle to the long axis. The hole may be shaped like a rectangle. The hole may be a square where a long axis is a diagonal across the square, and a short axis is an axis aligned with one of the sides through the centre of the square.

According to a further aspect, there is provided a rope protector comprising:

an enclosed channel portion configured to receive a rope, wherein the enclosed channel portion has a waisted portion configured to allow the rope protector to be passed partially through a hole in a grating; and a head portion laterally extending from a proximal end of the channel portion to prevent passage of the rope protector through the grating hole, wherein the head portion comprises a flared inner surface for supporting the rope as it exits the enclosed channel portion.

The channel may be configured such that the rope passes through (e.g. within) the head portion, the waisted portion and the foot portion. In all configurations, the bottom of the rope protector may be no lower than the bottom end of the enclosed channel. In all configurations, the top of the rope protector may be no higher than the top of the flared surface and/or the enclosed channel. These features may reduce the likelihood of the rope being entangled in other parts of the rope protector.

In the context of this disclosure, words like top and bottom are used in relation to the rope protector being used in conjunction with a horizontal grating in which the rope protector is inserted through the grating from above (e.g. where the head portion is above the grating and the foot portion is below). It will be appreciated that, in some circumstances, the rope protector could be used upsidedown (e.g. being inserted up through the grating) or on a non-horizontal surface (e.g. a vertical or inclined surface).

The rope protector may comprise a gripping portion connected to the head portion, wherein the gripping portion is configured to be moveable along the channel axis to grip the grating between the gripping portion and the foot portion.

The head portion may extend laterally in two dimensions (e.g. all dimensions around the channel axis). This may help prevent the head passing through the grating hole regardless of the orientation of the rope protector.

The gripping portion may be a collar positioned between the head portion and the foot portion around the enclosed channel portion. The gripping portion (e.g. collar) may extend laterally in two dimensions to prevent the collar passing through the grating hole regardless of the orientation.

The head and/or collar portions may have a lateral width (e.g. outer diameter) more than twice the lateral width (e.g. outer diameter) of the waisted portion in two dimensions (e.g. and less than 10 times).

The flared inner surface may have a lateral width (e.g. outer diameter) more than twice the lateral width (e.g. outer diameter) of the waisted portion in two dimensions (e.g. and less than 10 times). The flared inner surface may have an inner diameter substantially equal to the inner diameter of the channel. The flared inner surface may have a lateral width (e.g. outer diameter) more than four times the lateral width of the enclosed channel in two dimensions (e.g. and less than 10 times).

The foot portion may have a lateral width (e.g. lateral extent) more than twice the lateral width (e.g. outer diameter) of the waisted portion in one dimension (e.g. and less than 10 times). The foot portion may have a lateral width (e.g. lateral extent) substantially the same as the lateral width (e.g. outer diameter) of the waisted portion in one dimension (e.g. between 0.5 and 1.5 times). The foot portion may extend laterally along a foot axis.

At least a portion (e.g. some or all of the head portion, the collar, the channel portion and/or the foot portion) of the rope protector may be formed from a rigid material.

The gripping portion may be biased towards the foot portion (e.g. by a spring). The spring may be a helical spring wound around the channel portion.

The gripping portion may comprise a resilient material.

The gripping portion may be configured to conform to the grating.

The gripping portion may comprise grooves to engage with the grating. The grooves may be parallel, for example, to conform to standard rectangular grating grid configurations.

The gripping portion may be mounted on a screw thread to allow the distance between the gripping portion and the foot to be adjusted. This may allow the gripping portion to be screwed down onto the top of the grating when the foot portion is in place so that the rope protector grips the grating.

The gripping portion may be mounted on guide rails to prevent rotation of the gripping portion with respect to the foot. The guide rails may be formed from one or more grub screws screwed into the channel portion.

The head portion, the channel portion and the foot portion may be of unitary construction (formed by a single piece).

The head portion may comprise a flared inner surface for supporting the rope as it exits the enclosed channel portion.

The radius of curvature of the flared inner surface may be at least 1.5 times the inner diameter of the enclosed channel portion. The radius of curvature of the flared inner surface may be less than 10 times the inner diameter of the enclosed channel portion. The lateral radius of the curved portion from the channel axis may be greater than 5 times the inner radius of the enclosed channel portion. The lateral radius of the curved portion from the channel axis may be less than 15 times the inner radius of the enclosed channel portion. The radius of curvature of the flared inner surface may be at least 1.5 times the inner diameter of the rope. Generally, the rope has an outer diameter substantially the same as the inner diameter of the channel portion. Therefore, configuring the flared inner surface to be at least 1.5 times the inner diameter of the rope or the enclosed channel portion means that the rope is not subjected to significant changes in direction when exiting the top of the rope protector. This may help allow the rope to carry more weight and/or prevent damage to the rope.

The foot portion may comprise a series of steps of different height arranged in height order radially about the channel axis. Each step surface may form a trough (e.g. the step top surface is depressed or recessed such that, when the step is engaged, rotation of the foot portion is restricted in both directions). This may prevent the rope protector rotating when the grating is engaged between the step and the gripping portion.

The foot portion may comprise two protrusions extending diametrically from the channel axis. This may allow a more secure connection between the rope protector and the grating.

The foot portion may have 2-fold rotational symmetry about the channel axis.

The head portion may be substantially rotationally symmetric about the channel axis. The flared inner surface may be rotationally symmetric about the channel axis.

The rope protector may be formed from plastic. The rope protector may comprise a reinforcing metal member configured within the waisted portion. The reinforcing metal member may be aligned with the axis of the rope protector.

The enclosed channel portion, the head portion and the foot portion may be of unitary construction. This may reduce the likelihood of parts of the rope protector detaching and falling below the grating to which the rope protector is attached.

The internal volume of the rope protector may be formed with an infill structure. The term "infill" refers to the structure that is printed inside an object. It may be configured in a designated percentage and pattern, which may be set in slicing software (e.g. when using a 3D printer). Infill percentage and pattern influence print weight, material usage, strength, print time and sometimes decorative properties. The infill structure may have a combination of one or more of: a honeycomb structure; a grid structure; a Hilbert structure, a rectilinear structure and a linear structure.

The foot portion may be elastically mounted to the enclosed channel portion to be biased towards the head portion. This may help secure the rope protector to the grating.

The diameter of the enclosed channel may be between 5 and 30 mm (e.g. between 10 and 20 mm).

A waisted portion may be considered to be a portion which is shaped like a waist. A waisted portion may have sides which are narrower (e.g. closer together) in at least one dimension to a portion above the waisted portion and/or to a portion below the waisted portion.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

FIG. 1b is a front view of the embodiment of FIG. 1a.

FIG. 1c is a side view of the embodiment of FIG. 1a.

FIG. 1d is a top view of the embodiment of FIG. 1a.

FIG. 3b is a front view of the embodiment of FIG. 3a.

FIG. 3c is a side view of the embodiment of FIG. 3a.

FIG. 3d is a bottom view of the embodiment of FIG. 3a.

DETAILED DESCRIPTION

Introduction

Figure 1A:
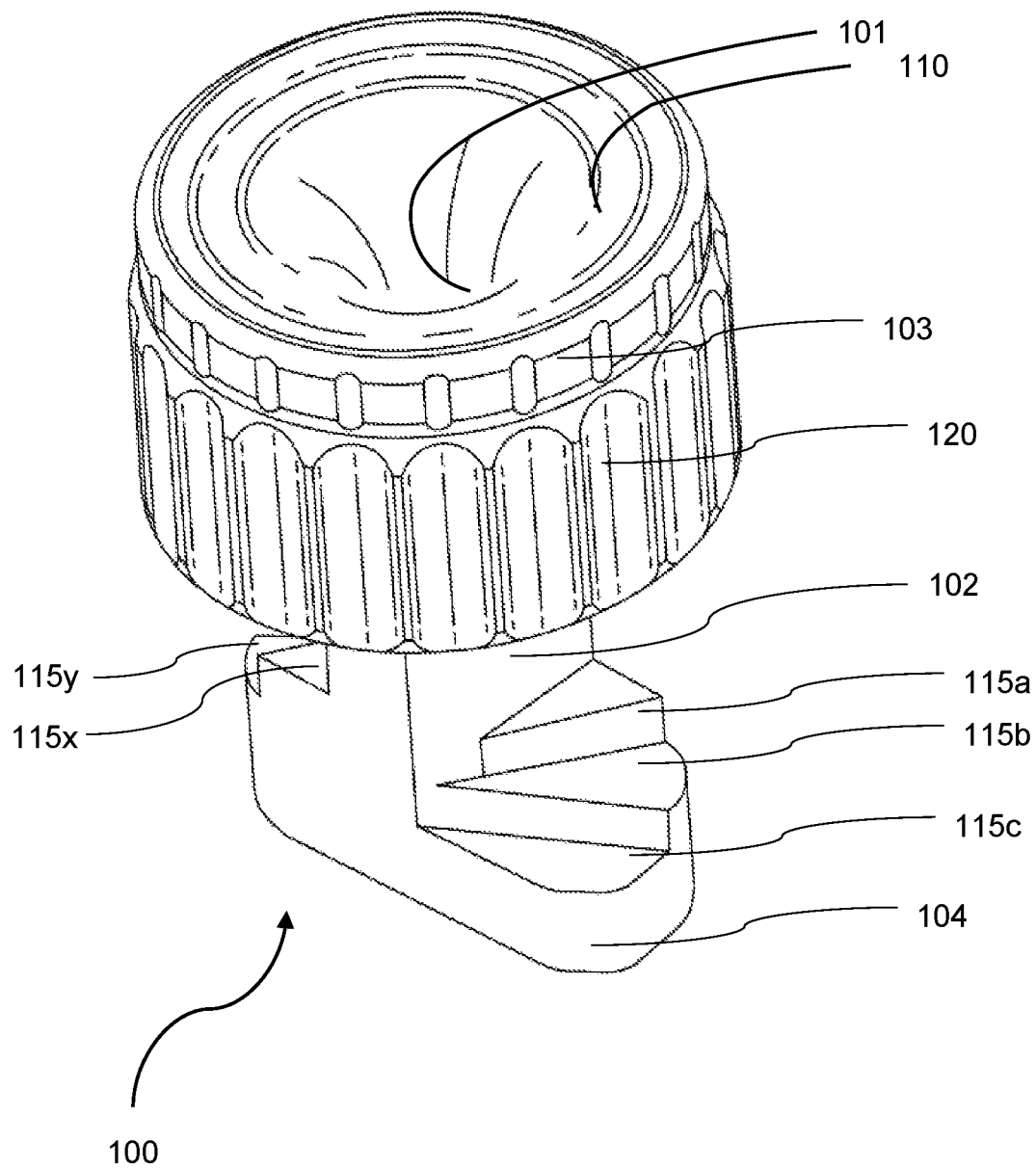
FIG. 1a is a perspective view of an embodiment of a rope protector.

When protecting rope passing through a grating, it is common practice to wrap a canvas or "soft" rope protector around the area of rope in contact with the grating. These are susceptible to abrasion over time and to physical cuts when in contact with sharp edges coupled with lateral movements of the rope access worker. In addition, conventional rigid rope protectors may allow the rope to bend with a smaller bend radius. The breaking strength of ropes may be reduced due to damage caused by acute loading angles over a small radius and sharp edges.

As described above, there are a number of rope protectors designed to allow a rope to pass through a grating without chaffing against the grating itself. The inventors have realized that it is important that the rope protector can be easily positioned through the grating and that when in position, the rope protector can be easily secured to the grating to prevent unintended and unwanted movement of the rope protector with respect to the grating.

The inventors have designed a rope protector for protecting a rope as it passes through a grating hole. The rope protector comprises an enclosed channel portion, a head portion and a foot portion. The channel portion is waisted to allow the rope to be rotated within a hole in a grating. The head portion extends laterally from a proximal end of the channel portion to prevent passage of the rope protector through the grating hole and the foot portion extends laterally from a distal end of the channel portion to allow the foot portion to be passed through the grating hole when aligned with the grating hole and to prevent the foot portion being removed from the grating hole when rotated.

The present rope protector may provide one or more of the following advantages:

Prevent ropes being used with too small of a "bend radius";

Reduce weight (which may make the unit easier to carry);

Make installation easier (which may allow users to stay off their knees on sharp grating);

Reduce the risk of the rope protector or parts of the rope protector falling from the grating; and Make installation more secure.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Rope Protector Embodiment

FIGS. 1a-1f show a rope protector 100 comprising:

an enclosed channel 101 portion configured to receive a rope 199, wherein the enclosed channel portion has a waisted portion 102 configured to allow the rope protector 100 to be passed partially through, and be rotated within, a hole 191 in a grating 190;

a head portion 103 laterally extending from a proximal end of the channel portion to prevent passage of the rope protector through the grating hole 191;

a foot portion 104 laterally extending from a distal end of the channel portion, wherein the foot portion 104 is configured to be passed through the grating hole when aligned with the grating hole and to prevent the foot portion being removed from the grating hole when rotated with respect to the grating hole.

Figure 1B:
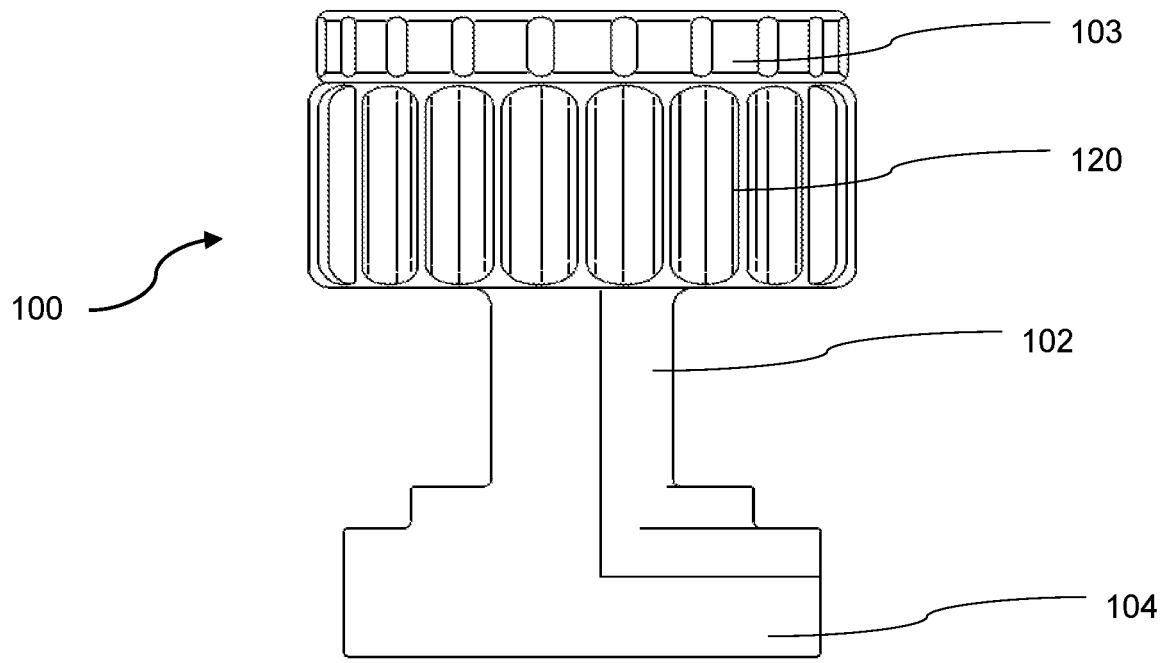
Figure 1C:
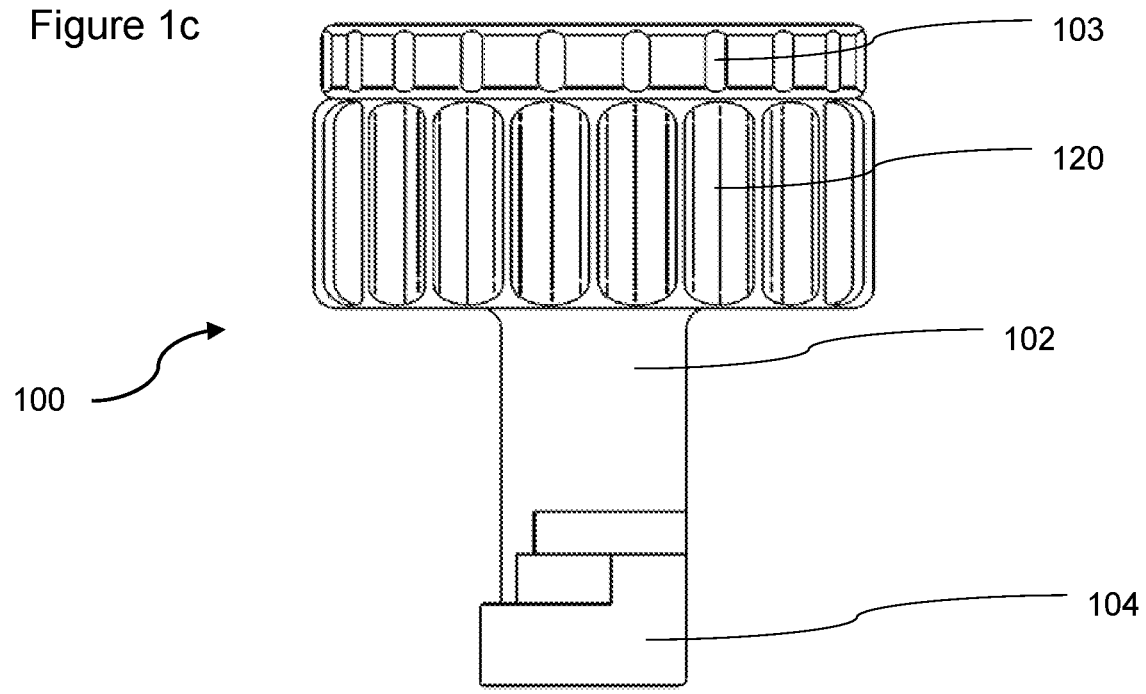
Figure 1D:
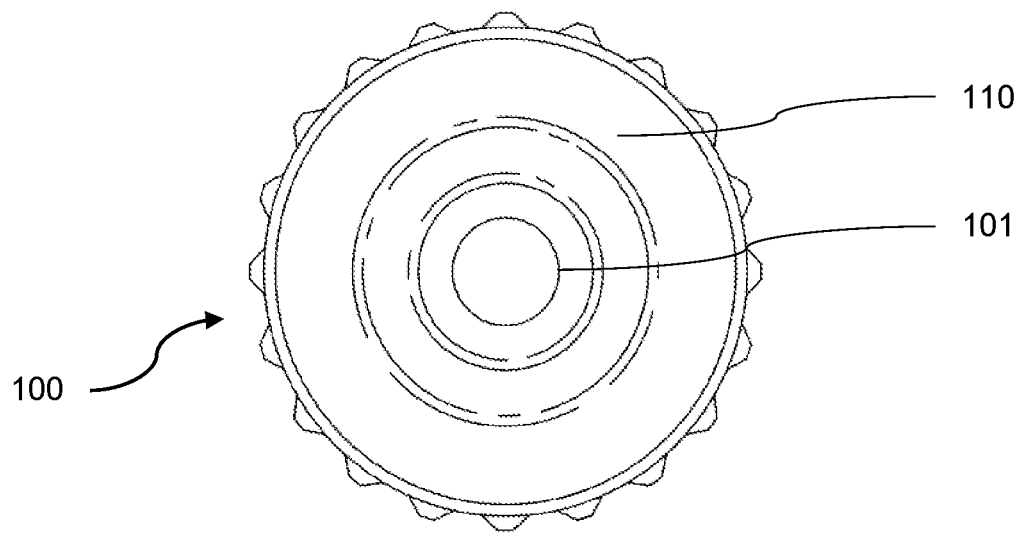
Figure 1E:
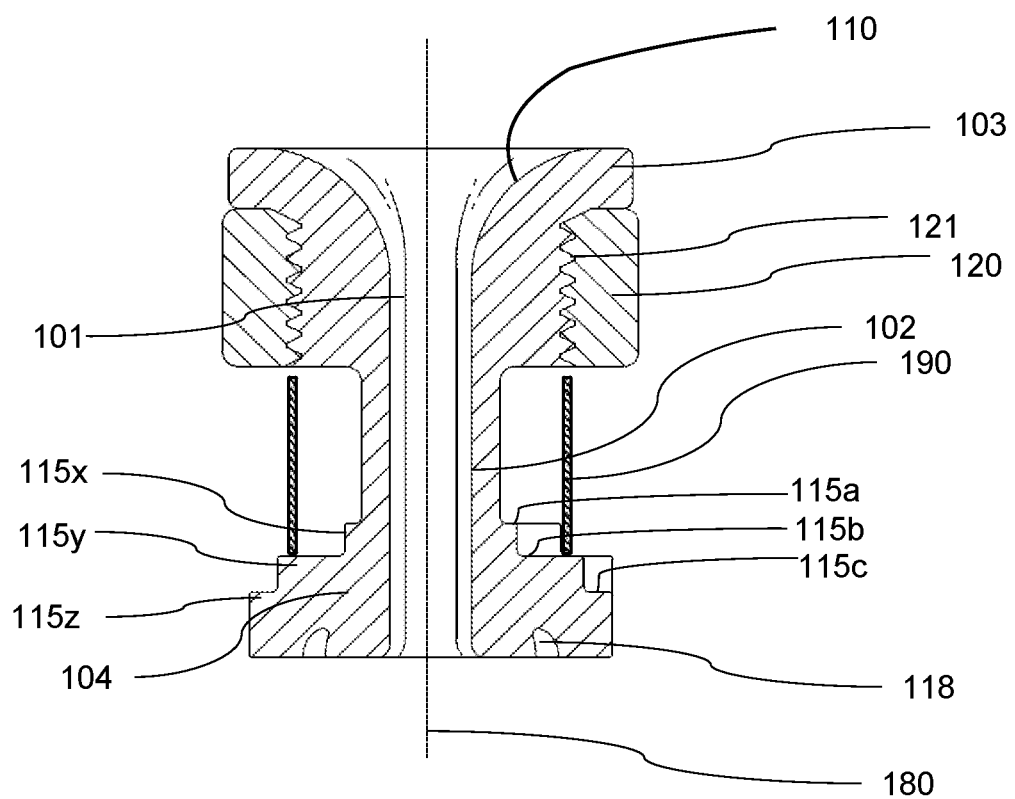
FIG. 1e is a cross-sectional view of the embodiment of FIG. 1a engaged with a grating.
Figure 1F:
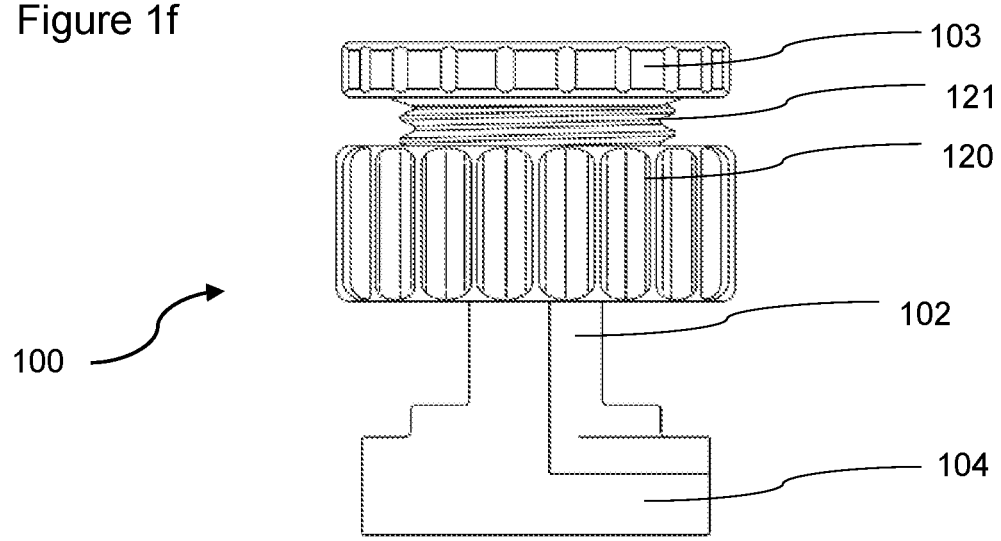
FIG. 1f is a side view of an embodiment of a rope protector of FIG. 1a with the collar in a different position.
Figure 1G:
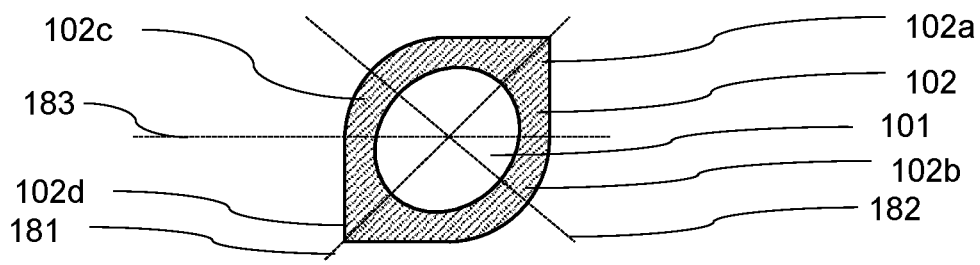
FIG. 1g is a cross-sectional view through the waisted portion.

In this case, the rope protector is formed from plastic (e.g. nylon). For example, the rope protector may be 3D printed or injection moulded or manufactured using Computer Numerical Control (CNC). In this case the channel 101 has a minimum channel diameter of 15 mm within the waisted portion. This channel diameter may be used with a rope diameter of 11 mm. Other channel diameters may be used depending on the rope diameter that is to be used. The cross-section of the waisted portion transverse to the channel axis is shown in FIG. 1g. In this case, the waisted portion 102 is shaped like a square with two opposing corners smoothed off 102b,c and two sharp corners 102a,d. The smoothed corners 102b,c are configured to allow the waisted portion 102 to freely rotate up to a one-quarter turn (90°) inside the grating. The sharp corners are configured to help prevent over-rotation of the waisted portion within the grating. In addition, the sharp corners provide more room within the waisted portion such that, in this case, the channel cross-section within the waisted portion is a slightly elongated circle or oval. The diameter of the channel along the long axis 181 is 16 mm. This may allow larger items such as tags to be more easily fed through the channel. The long axis is 45° to the foot axis 183 and is between the two sharp corners 102a,d. The diameter of the channel along the short axis 182 is 15 mm. The short axis is 45° to the foot axis 183 and is between the two smoothed corners 102b,c. It will be appreciated that other waisted portion cross-sections may be used in other embodiments (e.g. circular or rhomboid shaped).

To allow the rope to change direction above the rope protector, the head portion comprises a flared inner surface 110 for supporting the rope as it exits the enclosed channel portion. By controlling the degree of bending, the effective breaking strength of the rope may be increased. The radius of curvature of the flared inner surface is around 2-3 times the inner diameter of the enclosed channel portion (e.g. between 1.5 and 3.5). In this case radius of curvature of the flared inner surface is 33 mm. The enclosed channel (including the flared surface) is circularly symmetric about the channel axis as shown in FIG. 1d.

Figure 2:
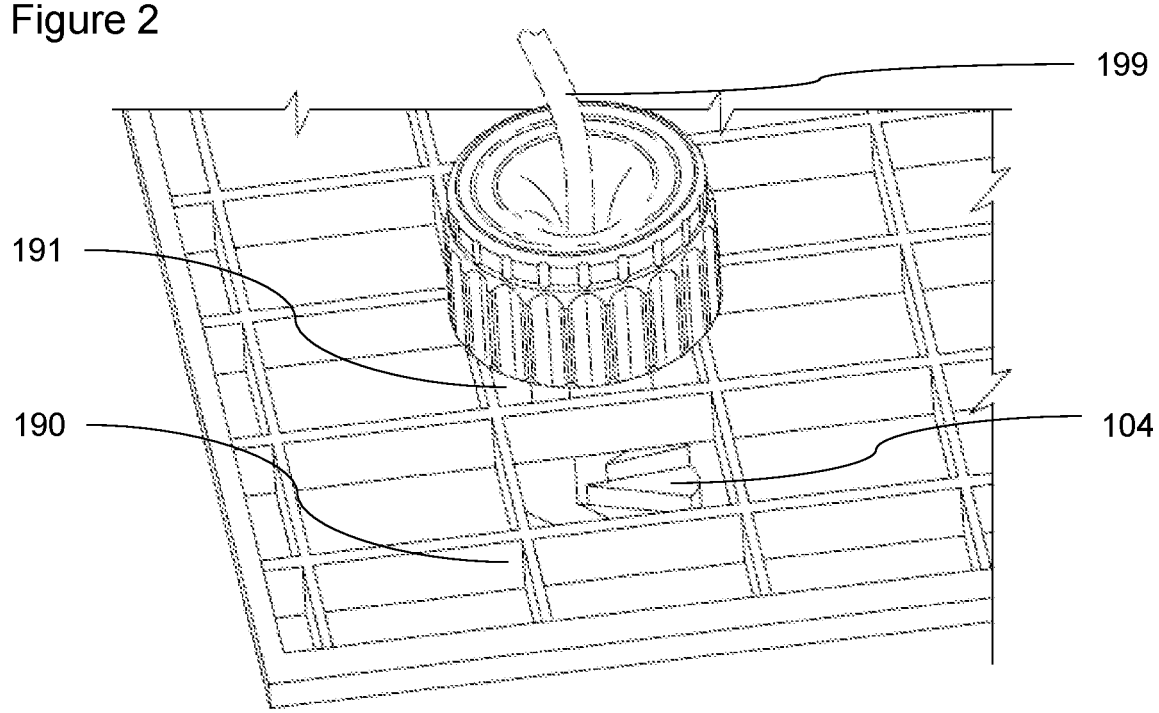
FIG. 2 is a perspective view of the embodiment of FIG. 1a engaged with a grating.

The rope protector can be used in conjunction with a grating as shown in FIG. 2. A grating may be considered to be a framework of bars (e.g. parallel or crossed), typically preventing access through an opening while permitting communication or ventilation. The grating may be in the form of a grid. The grating may provide a walking surface on an industrial site or in scaffolds. Gratings may be of various size, but are generally 1-2 inch thick with openings that are approximately 1 inch wide by 1 to 10 inches long. In the embodiment illustrated in FIGS. 1 to 2, the rope protector is designed to work with a grating having rectangular shaped openings.

In this case the head portion 103 extends laterally in two dimensions, and the head portion 103, the waisted portion 102 and the foot portion 104 are of unitary construction (formed by a single piece). These features help prevent the head portion 103 passing through the grating hole regardless of the orientation of the rope protection. This may help mitigate the risk of objects (e.g. the rope protector 100 itself or components of the rope protector) falling through the grating 190.

In this case, the rope protector has a gripping portion 120 connected to the head portion. The gripping portion 120 in this case is a collar positioned between the head portion 103 and the foot portion 104 (e.g. around the waisted channel portion 102). Using a collar 120 positioned between the laterally extended head portion 103 and the laterally extended foot portion 104 may help prevent the collar 120 being removed from the rope protector unit 100.

The gripping portion 120 is configured to be moveable along the channel axis 180 to grip the grating 190 between the gripping portion 120 and the foot portion 104. In this case, the collar 120 has a screw thread which engages with a complementary screw thread below the head portion 103. The complementary screw threads 121 in this case has a narrower diameter than the head portion 103 and a wider diameter than the waisted portion 102. This may reduce the forces applied to the screw threads. The screw thread allows the collar 120 to be screwed towards the foot portion 104 to engage with the grating. In this case, the collar has a flat base. FIGS. 1b, 1c and 1e show the rope protector when the collar is screwed to towards the head 103. FIG. 1f shoes the rope protector when the collar is screwed to towards the foot portion 104.

In this case, the height of the collar 120 is 25 mm. It will be appreciated that, in other embodiments, the height of the collar may be different (e.g. between 15 and 50 mm). In this case, the height of the screw threads 121 on the collar is 26 mm. It will be appreciated that, in other embodiments, the height of the screw threads on the collar may be different (e.g. between 15 and 50 mm). The total height of the rope protector in this case is 93 mm. In other embodiments, the total height of the rope protector may be between 50 and 200 mm.

In this case, the head portion 103 and the collar 120 have ergonomic gripping surfaces so that the rope protector 100 can be installed by hand. In this case, the outer diameter of the collar 120 is slightly larger than the outer diameter of the head portion 103. This may make it easier for the user to rotate the collar without needing tools. The outer diameter of the collar may be less than 20% larger than the outer diameter of the head portion. It will be appreciated that other embodiments may have other gripping surfaces (e.g. to be engaged and tightened using tools such as a wrench).

In other embodiments, a helical spring wound around the channel portion is used to bias the gripping portion towards the foot portion. This means that when the foot is inserted through the grating and rotated into position, the gripping portion will exert a compressive force on the grating to hold the rope protector firmly in place. This helps prevent the rope protector being removed and also helps prevent the rope protector moving within the grating hole.

To secure the rope protector, the user inserts the foot portion 104 of the rope protector through the hole with the projecting foot aligned with the grating hole 191. Then when the foot portion 104 is below the grating, the foot can be rotated by rotating the head 103 (as the foot portion, the channel portion and the head portion are a single unit). When the foot portion 104 is rotated, the foot can engage with the bottom of the grating 190 as shown in FIG. 2. The gripping portion 120 then is screwed downwardly to exert a force on the top of the grating 190 thereby securing the rope protector 100 to the grating 190 by gripping the grating between the foot portion 104 and the gripping portion 120.

In this case, the foot portion comprises two protrusions extending diametrically in opposite directions from the channel axis. This may allow a more secure connection between the rope protector and the grating than having a single foot protrusion. The foot portion 104 is configured not to extend away from the waisted portion in the other directions as shown in FIG. 1c, which shows that, from the side, the foot portion 104 is the same width as the waisted portion 102. This may make the rope protector easier to insert into a hole 191 in the grating 190.

In this case, each protrusion of the foot portion has a series of steps 115a-c, 115x-z of different height arranged in pairs in height order radially about the channel axis (e.g. forming a helical step structure). By using a helical structure, the user can simply continue to rotate the foot portion 104 until the vertical portion of a step 115 impinges on the side of the grating bar 190. This automatically positions the closest useable step directly below the grating bar 190.

In this case, the distance between the bottom step and the bottom of the collar when fully up is around 41 mm; the distance between the middle step and the bottom of the collar when fully up is around 35 mm; and the distance between the to step and the bottom of the collar when fully up is around 28 mm. The height difference between successive steps may be less than half of the height of the engaged screw portion when the collar is fully up. This allows movement of the collar to tighten in on the grating (while still being have engaged with the screw) regardless of the height of the grating. It may also reduce the need to screw the collar to around 4-5 mm of collar per step.

In this case, the handedness of the collar screw and the handedness of the helical step structure is the same. This means that when the user tightens the collar 120 (by screwing it down towards the foot), the steps are rotated to engage the grating. This helps ensure that the highest step is used which reduces the amount of tightening required and which means that a larger portion of the complementary screws are engaged (which may make the protector more robust). Likewise, when loosening the collar, rotation of the collar 120 will move the steps 115 away from the grating. This may make the protector 100 easier to remove.

To be useable, the rope protector 100 should be configurable such that the distance between the step gripping surface and the opposing gripping surface is greater than the depth of the grating. It is also preferable if the range of motion between the step and the opposing gripping surface (e.g. through using a movable or resilient gripping portion) is capable of being greater than the depth of the grating (e.g. to allow positioning of the gripping surfaces around the grating) and of being less than the depth of the grating (e.g. to allow a gripping force to be applied by the gripping surfaces to the grating).

Using the closest useable step may increase the gripping force than can be applied to the grating thereby forming a more secure grip with the grating. The steps 115 may be flat (e.g. the top surfaces of the steps may lie in a plane normal to the rotation axis) or be in the form of a trough to help prevent the rope protector rotating when the grating is engaged between the step and the gripping portion.

The foot portion 104 in this case has 2-fold rotational symmetry about the channel axis. This means that when the foot portion is rotated after insertion through the grating hole, each protrusion can interact in the same way with either side of the grating hole.

In this case, the foot portion comprises connectors 118 for connecting an accessory cord which could act as a carrying handle and/or be used for connecting flexible rope protection to protect the rope below the grating.

Other Embodiment

Figure 3A:
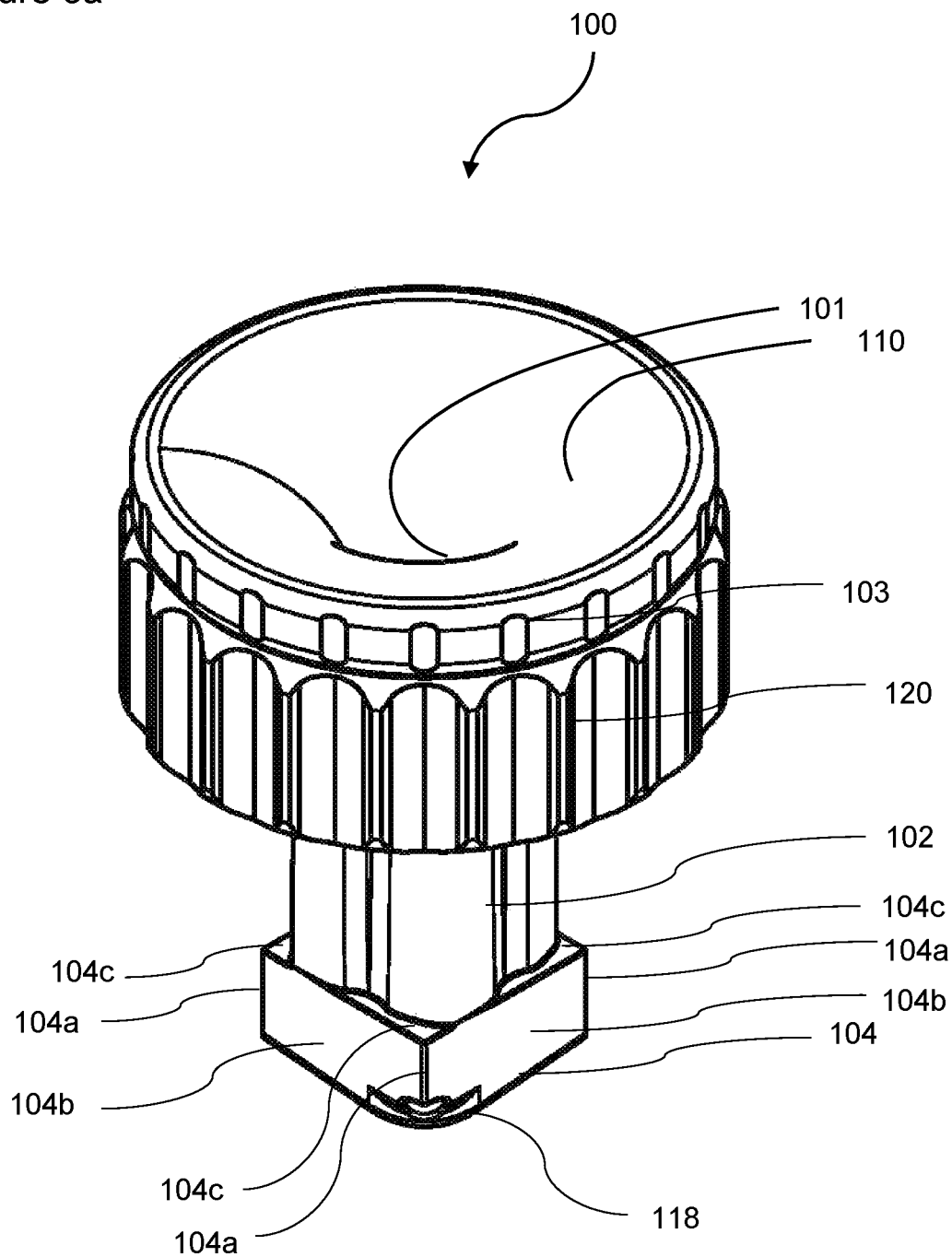
FIG. 3a is a perspective view of an embodiment of the rope protector.
Figure 3B:
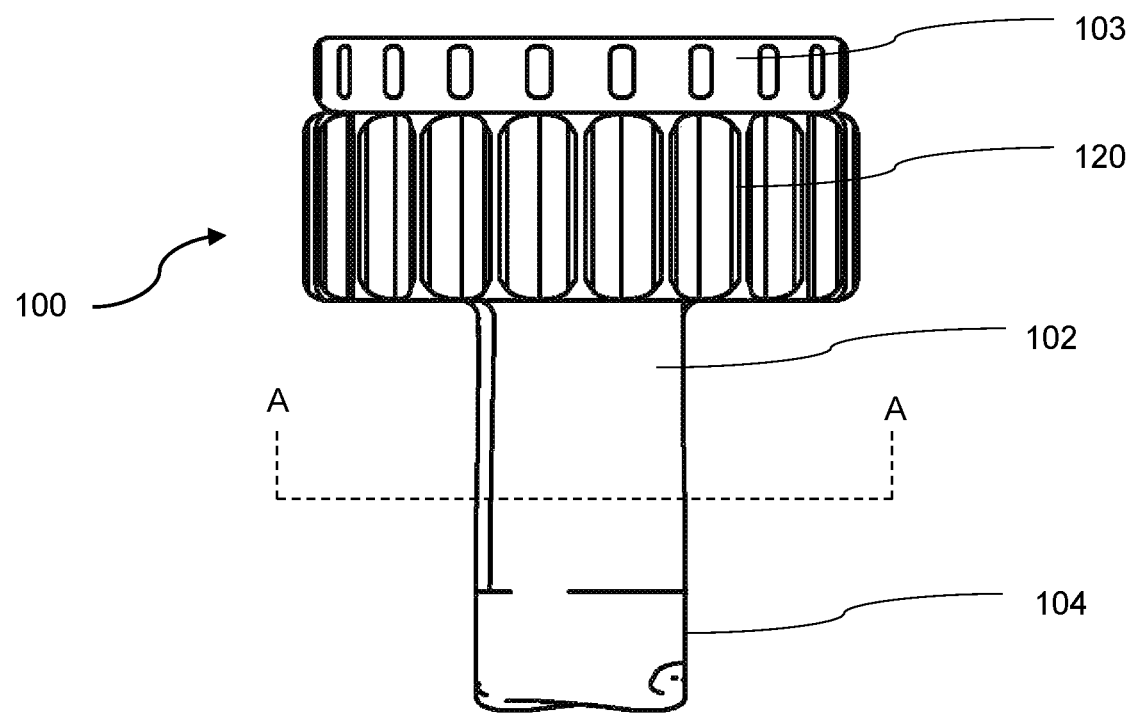
Figure 3C:
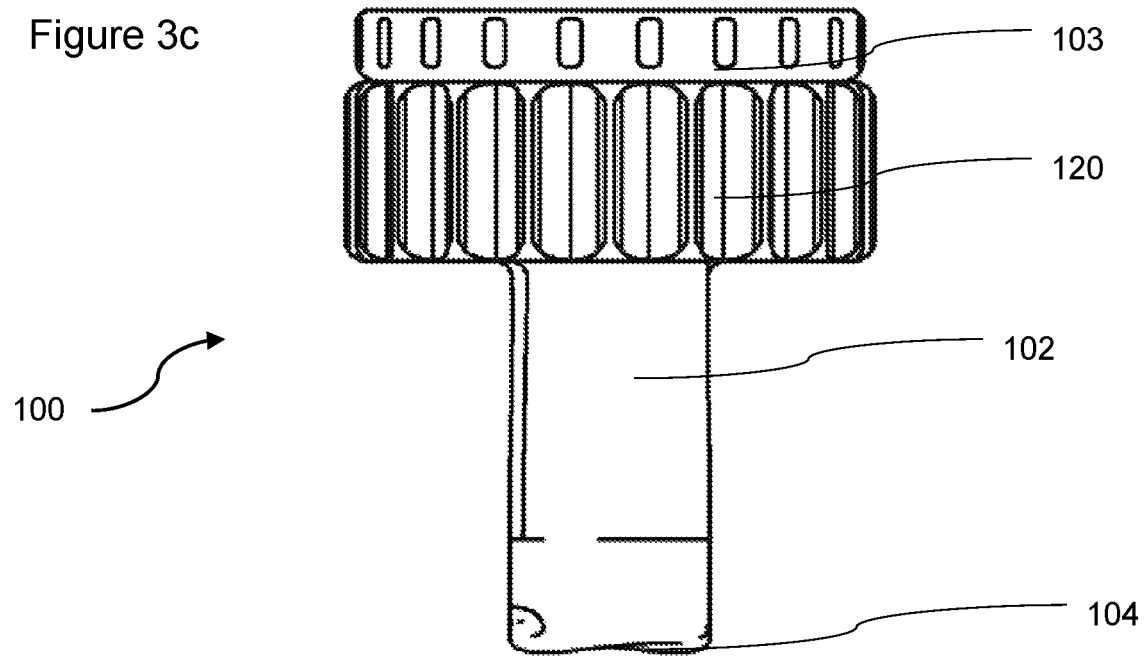
Figure 3D:
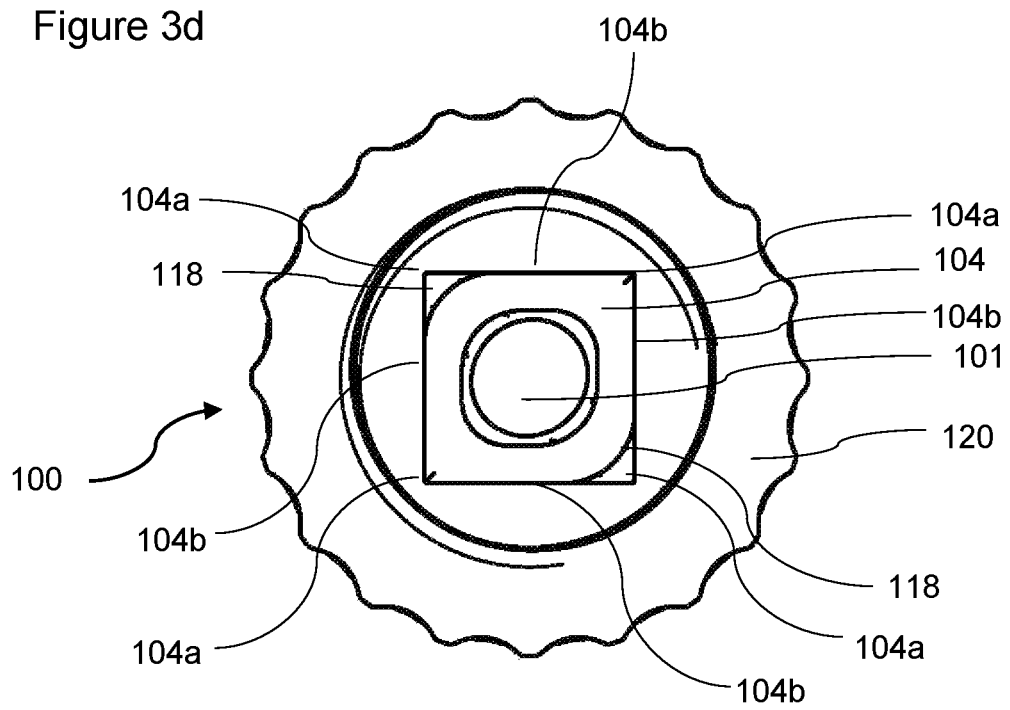
Figure 3E:
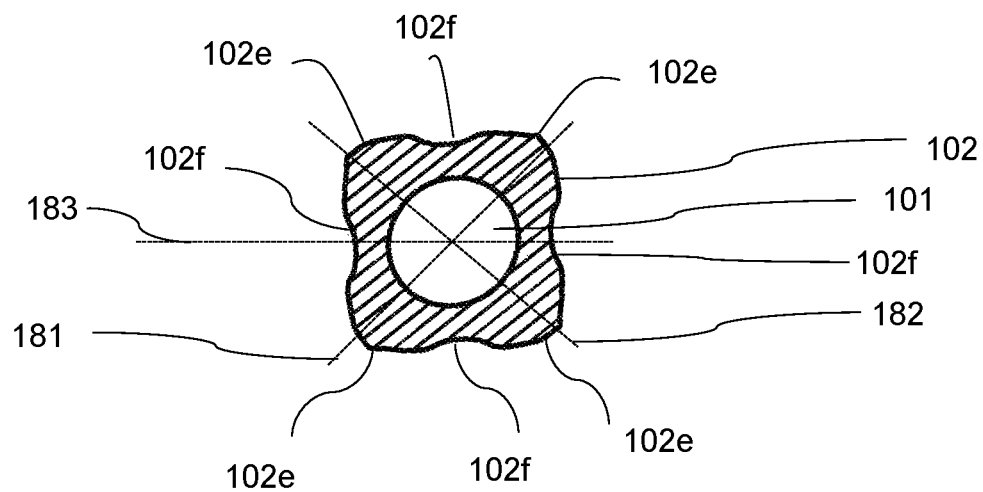
FIG. 3e is a cross-sectional view of the embodiment of FIG. 3a taken along line A-A in FIG. 3b.
Figure 4A:
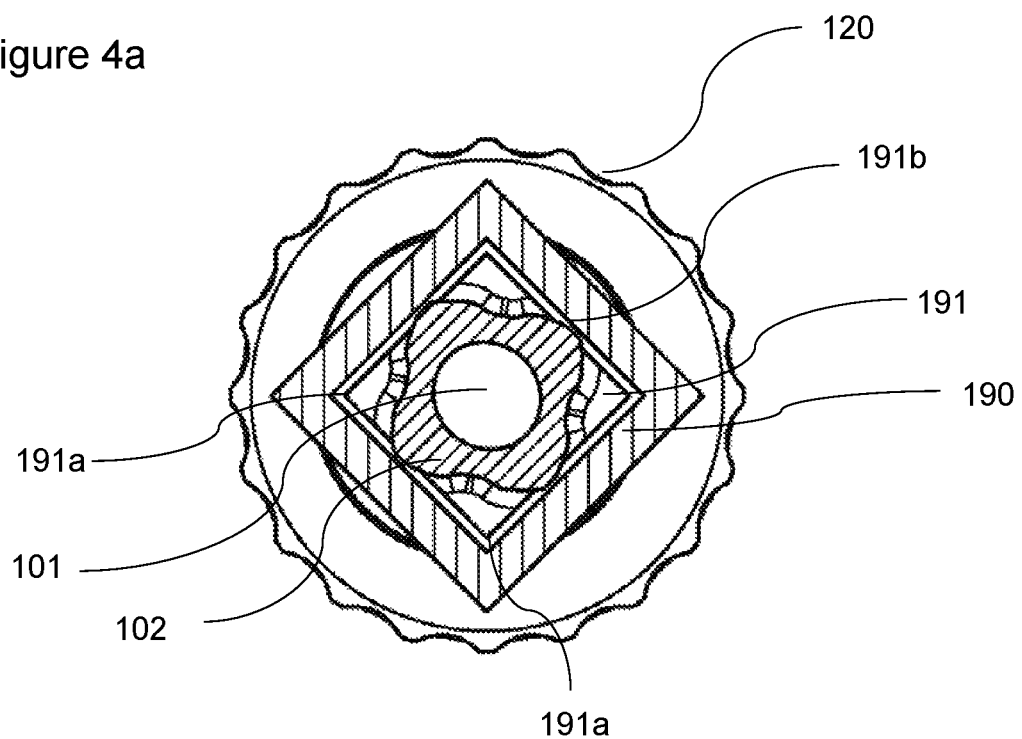
FIG. 4a is a cross-sectional view of the embodiment of FIG. 3a engaged with a grating.
Figure 4B:
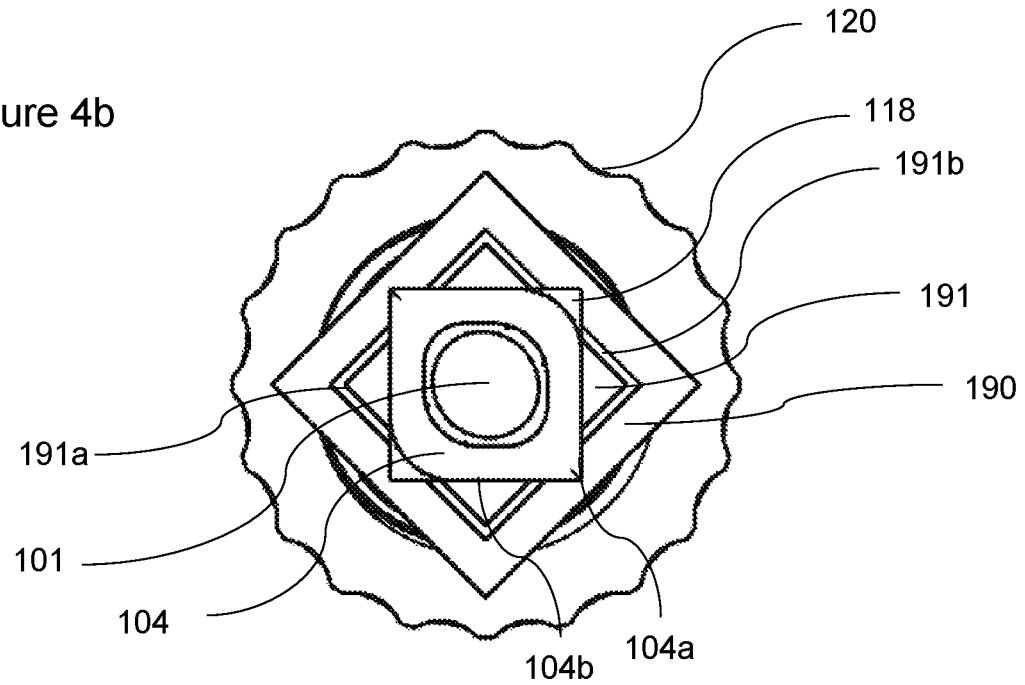
FIG. 4b is a bottom view of the embodiment of FIG. 3a engaged with a grating.

In another embodiment, as illustrated in FIGS. 3a to 4b, the rope protector 100 has a waisted portion 102 and foot portion 104 designed to work with a grating having a mesh with square-shaped holes 191. FIG. 4b shows a bottom view of the rope protector 100 engaged with a grating having square shaped holes 191.

In this case, the foot portion 104 is a cube-shaped section at one end of the waisted portion 102 having a square cross-section with four corners 104a connected by four sides 104b. The square shape of the foot portion is aligned with the square shaped grating hole 191 (i.e. the corners 104a of the foot portion and the corners 191a of the grating hole 191 are aligned) to pass the foot portion through the grating hole. Then when the foot portion 104 is below the grating, the foot portion can be rotated by rotating the head 103 (as the foot portion, the channel portion and the head portion are a single unit). When the foot portion is rotated 45 degrees, as shown in FIG. 4b, the corners 104a of the foot portion 104 are offset from the corners 191a of the grating hole such that the foot portion corners 104a are positioned below the straight sides 191b of the grating hole. In this position, an upper surface 104c of each of the four corners 104a of the foot portion is engaged with a lower surface of the grating. Then, the gripping portion 120 can be screwed downwardly to exert a force on the top of the grating 190 thereby securing the rope protector 100 to the grating 190 by gripping the grating between the foot portion 104 and the gripping portion 120. This gripping force as well as the misalignment of the square shape of the foot portion and the square grating hole prevents the foot portion from being removed from the grating hole and securely holds the rope protector in the grating hole.

The cross-section of the waisted portion transverse to the channel axis can be shaped as shown in FIG. 3e. In this case, the waisted portion 102 is shaped like a square with rounded corners 102e and a curved indent 102f along each side of the square. This shape allows the waisted portion to fully rotate in the square grating hole and provides tactile feedback to the user during rotation so that the user knows if the foot portion 104 is aligned or misaligned with the grating hole. That is, when the foot portion is aligned with the grating hole 191 to allow the foot portion to be inserted into or removed from the grating hole, the rounded corners 102e of the waisted portion 102 will be generally aligned with the corners 191a of the grating hole to allow the waisted portion 102 to move freely into or out of the grating hole. Once the waisted portion is located in the grating hole, the rope protector is rotated 45 degrees to offset the foot portion corners 104a and the waisted portion rounded corners 102e from the grating hole corners 191a (i.e. in the misaligned position) as shown in FIG. 4a. As the rope protector is being rotated into the misaligned position, a user will encounter more resistance as the misaligned position is approached due to the friction between the waisted portion rounded corners 102e and the edges 191b of the grating hole. If the user rotates the rope protector past the misaligned position, i.e. greater than 45 degrees, they will encounter less resistance which lets them know they have rotated the rope protector too far.

Other Options

The foot portion may be elastically mounted to the enclosed channel portion to be biased towards the head portion.

The internal volume of the rope protector may be formed with an infill structure. The term "infill" refers to the structure that is printed inside an object. It may be configured in a designated percentage and pattern, which may be set in slicing software (e.g. when using a 3D printer). Infill percentage and pattern influence print weight, material usage, strength, print time and sometimes decorative properties. The infill structure may have a combination of one or more of: a honeycomb structure; a grid structure; a Hilbert structure, a rectilinear structure and a linear structure.

The rope protector may comprise a handle for carrying.

In other embodiments, it will be appreciated that the gripping portion may comprise a resilient material. That is, a compressive force may be applied to the grating by compressing the resilient material between, for example, a rigid head portion and the grating. A resilient gripping portion may be configured to be positioned between the head and the grating and/or between the foot and the grating when the rope protector is in an engaged configuration.

In some embodiments (particularly those which have a collar which can move up and down with respect to the foot without rotation or screwing), the gripping portion is configured to conform to the grating by having grooves (which are typically parallel for use with rectangular grating grids) on the gripping surface to engage with the grating. In order to ensure that the grooves align with the grating, the gripping portion is mounted on guide rails to prevent rotation of the gripping portion with respect to the foot. In some cases, the foot may have several steps to permit use with different grating thicknesses. In embodiments with several steps, the gripping portion may have a set of grooves corresponding to each step of the foot.

In some cases, guide rails may be formed from one or more grub screws screwed into the channel portion. In other embodiments, the gripping portion may be rotatable independently from the foot so that, for example, the grooves can be aligned with different step heights.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A rope protector comprising:
    an enclosed channel portion configured to receive a rope, wherein the enclosed channel portion has a waisted portion configured to allow the rope protector to be passed partially through, and be rotated within, a hole in a grating;
    a head portion laterally extending from a proximal end of the channel portion to prevent passage of the rope protector through the grating hole;
    a foot portion at a distal end of the channel portion, wherein the foot portion is configured to be passable through the grating hole when aligned with the grating hole and to prevent the foot portion being removed from the grating hole when rotated to be in non-alignment with the grating hole.

2. The rope protector of claim 1, wherein the rope protector comprises a gripping portion connected to the head portion, wherein the gripping portion is configured to be moveable along the channel axis to grip the grating between the gripping portion and the foot portion.

3. The rope protector according to claim 2, wherein the gripping portion is a collar positioned between the head portion and the foot portion around the enclosed channel portion.

4. The rope protector according to claim 2, wherein the gripping portion is biased towards the foot portion by a spring.

5. The rope protector according to claim 2, wherein the gripping portion comprises a resilient material.

6. The rope protector according to claim 2, wherein the gripping portion is configured to conform to the grating.

7. The rope protector according to a claim 2, wherein the gripping portion comprises parallel grooves to engage with the grating.

8. The rope protector according to claim 2, wherein the gripping portion is mounted on guide rails to prevent rotation of the gripping portion with respect to the foot.

9. The rope protector according to claim 2, wherein the gripping portion is mounted on a screw thread to allow the distance between the gripping portion and the foot to be adjusted.

10. The rope protector according to claim 1, wherein the head portion comprises a flared inner surface for supporting the rope as it exits the enclosed channel portion.

11. The rope protector according to claim 10, wherein the radius of curvature of the flared inner surface is at least 1.5 times the inner diameter of the enclosed channel portion.

12. The rope protector according to claim 1, wherein the foot portion comprises a series of steps of different height arranged radially about the channel axis in height order.

13. The rope protector according to a claim 1, wherein the foot portion comprises two protrusions extending diametrically from the channel axis.

14. The rope protector according to claim 1, wherein the foot portion has 2-fold rotational symmetry about the channel axis.

15. The rope protector according to claim 1, wherein the head portion is rotationally symmetric about the channel axis.

16. The rope protector according to claim 1, wherein the rope protector is formed from plastic.

17. The rope protector according to claim 1, wherein the internal volume of the rope protector is formed with an infill structure.

18. The rope protector according to claim 1, wherein the foot portion is elastically mounted to the enclosed channel portion to be biased towards the head portion.

19. The rope protector according to claim 1, wherein the enclosed channel portion, the head portion and the foot portion are of unitary construction.

20. A rope protector comprising:
    an enclosed channel portion configured to receive a rope, wherein the enclosed channel portion has a waisted portion configured to allow the rope protector to be passed partially through a hole in a grating; and
    a head portion laterally extending from a proximal end of the channel portion to prevent passage of the rope protector through the grating hole, wherein the head portion comprises a flared inner surface for supporting the rope as it exits the enclosed channel portion.

* * * * *